3/31/87 XR 4,654,558

United States Patent [19]

Obata et al.

[11] Patent Number: 4,654,558

[45] Date of Patent: Mar. 31, 1987

[54] FIBER OPTIC PHOSPHOR SCREEN AND A METHOD OF MANUFACTURING THE SAME

[75] Inventors: Yoshiharu Obata, Yokohama; Takashi Noji, Odawara; Masahiro Sugiyama; Shigeharu Kawamura, both of Yokohama, all of Japan

[73] Assignee: Tokyo Shibaura Denki Kabushiki Kaisha, Kawasaki, Japan

[21] Appl. No.: 817,164

[22] Filed: Jan. 8, 1986

Related U.S. Application Data

[63] Continuation of Ser. No. 558,887, Dec. 7, 1983, abandoned.

[30] Foreign Application Priority Data

Dec. 9, 1982 [JP] Japan ............................... 57-215701
Jan. 31, 1983 [JP] Japan ............................... 58-13978

[51] Int. Cl.[4] .......................... H01J 29/24; G02B 6/08

[52] U.S. Cl. .................................... 313/372; 313/475; 350/96.27

[58] Field of Search ............................... 313/372, 475; 350/96.24–96.27, 96.32, 320; 358/901; 427/64

[56] References Cited

U.S. PATENT DOCUMENTS

| | | | |
|---|---|---|---|
| 2,979,632 | 4/1961 | Mac Neille | 358/901 X |
| 3,139,340 | 6/1964 | Harp et al. | 350/96.27 X |
| 3,237,039 | 2/1966 | Fyler | 313/475 |
| 3,301,950 | 1/1967 | Gebel | 350/96.27 X |
| 3,712,986 | 1/1973 | Collings | 350/96.27 X |
| 4,264,408 | 4/1981 | Berham | 313/372 X |

FOREIGN PATENT DOCUMENTS 4019855 12/1965 Japan .

*Primary Examiner*—Palmer C. DeMeo
*Assistant Examiner*—Sandra L. O'Shea
*Attorney, Agent, or Firm*—Cushman, Darby & Cushman

[57] ABSTRACT

A phosphor screen constructed by forming a phosphor layer on one side of an optical fiber plate consisting of a large number of bundled single optical fibers, each of which fibers comprises a cylindrical core and a clad surrounding the curved surface of the fiber core. At least that side of the respective fiber cores which faces the phosphor layer is removed, to provide a depression. Sufficiently large spaces are formed between the fiber cores and phosphor layer, to prevent both members from being brought into optical contact with each other.

10 Claims, 11 Drawing Figures

FIBER OPTIC PHOSPHOR SCREEN AND A METHOD OF MANUFACTURING THE SAME

This is a continuation of application Ser. No. 558,887, filed Dec. 7, 1983, which was abandoned upon the filing hereof.

BACKGROUND OF THE INVENTION

This invention relates to a phosphor screen formed by depositing a phosphor layer on a substrate consisting of a fiber plate, and a method of manufacturing said phosphor screen.

An image tube containing a phosphor screen, such as an X-ray image intensifier, is mainly applied in medical uses, although it also used in an industrial X-ray television designed for industrial nondestructive examination.

The above-mentioned X-ray image intensifier is constructed as illustrated, for example, in FIG. 1. An input screen 2 is located, on the input side, within a vacuum envelope 1. An anode 3 and output screen 4 are provided, on the output side, within said glass vacuum envelope 1. A focusing electrode 5 extends along the inner lateral wall of the vacuum envelope 1. The input screen 2 comprises a spherical aluminum substrate 6, an input phosphor layer 7 prepared from CsI and stretched along the output side (concave plane) of said substrate 6, and a photocathode 8 formed on the surface of said phosphor layer 7. The output screen 4 is formed of a substrate 9 and an output phosphor layer 10 mounted on the surface of said substrate 9.

The X-ray image intensifier constructed as described above is operated in the following manner. An X-ray beam penetrating a foreground subject and modulated in accordance with the magnitude of the X-ray transmittance of said foreground subject enters the X-ray image intensifier, to excite the input phosphor layer 7. A light generated by said excitation energizes the photocathode 8, which in turn issues electrons. The released electrons are accelerated by the action of an electron lens comprised of an anode 3 and focusing electrode 5, and focused on the output phosphor layer 10, which in turn irradiates light. The above-mentioned process amplifies the electrons. Thus, a light image decidedly brighter than the light image obtained by the input phosphor layer 7 is released from the output phosphor layer 10.

Japanese Patent Application Disclosure No. 53-24,770 discloses an X-ray image intensifier of the abovementioned type, which is characterized in that contrast is improved by forming an output phosphor layer on an optical fiber plate. As shown in FIG. 2, an output screen 16 consists of an optical fiber plate 17 and an output phosphor layer 10 deposited on said optical fiber plate 17. The output screen 16 is placed on the output side, within the vacuum envelope 1. The above-mentioned construction of the output screen 16 makes it impossible to directly draw out an image signal from the vacuum envelope, unlike the arrangement in which the optical fiber plate is used as part of the vacuum envelope, and therefore requires the application of a lens system. However, the Japanese disclosure No. 53-24,770 X-ray image intensifier has an advantage in that an accelerating voltage can be impressed in the same manner as in the X-ray image intensifier shown in FIG. 1. Nevertheless, the device proposed in said Japanese patent application disclosure No. 53-24,770 also has drawbacks in that the improvement in the image contrast remains unsatisfactory. The reason for this is given below. FIG. 3 illustrates the manner in which light reflection takes place within an optical fiber. The optical fiber consists of a core 101 and clad 102. Let us assume that $n_1$ denotes the refractive index of the core 101, $n_2$ represents the refractive index of the clad 102 and $n_0$ shows the refractive index of a vacuum. Then, the maximum value of an incident angle $\theta_0$ with respect to the optical fiber, which is required to assure the transmission of a light through the optical fiber, by repeating total reflection, may be expressed as follows:

$$n_0 \sin\theta_0 = \sqrt{n_1^2 - n_2^2}$$

For the sake of description, let it be assumed that $n_1$ equals 1.8 and $n_2$ equals 1.49. In such a case, the incident angle $\theta_0$ is determined, from the above equation, to be about 90°. This means that all light rays entering the optical fiber from the region of the vacuum are transmitted through said optical fiber. To confirm this event concretely, the refractive angle $\theta_1$ of a light ray entering the core 101 at an angle of, e.g., 90° is determined to be 33.7° from the equation, $n_1 \sin\theta_2 = n_2 \sin\theta_0$. The critical angle $\theta_2$ of total reflection at the boundary between the core 101 and clad 102 is determined to be 55.9°, from the equation, $n_1 \sin\theta_2 = n_2 \sin\theta_3$ ($\theta_3 = 90°$). An incident angle $\Phi_1$ of a light ray having a refractive angle $\theta_1$ of 33.7° with respect to the boundary between the core 101 and clad 102 is 90°-33.7°, which equals 56.3°, a value larger than the aforementioned critical angle. Therefore, the light ray is transmitted through the fiber by repeating total reflection, without leaking into the adjacent fiber, and is finally brought to the opposite plane of the fiber to that plane thereof at which the light enters.

When, however, a phosphor layer is deposited over an optical fiber plate, a noticeable change occurs in the above-mentioned process of light transmission. The manner in which the light is transmitted through the fiber plate 17 may now be described, with reference to FIG. 4. The phosphor layer 10 is generally formed by attaching phosphor particles 201 to the surface of the fiber plate 17, by means of a vitreous bonding agent. The fiber plate 17 and phosphor particles 201 are in firm contact with each other, as optically viewed. Since, therefore, light beams emitted from the phosphor particles 201 enter the core 101 of the fiber through said vitreous bonding agent, without being conducted through a free space, some of said light rays are at an incident angle $\Phi_1$ (FIG. 3) exceeding 33.7°. This means that some of the light rays have an incident angle $\Phi_1$ narrower than the critical angle of 55.9°. Light rays having such a small incident angle are transmitted to the adjacent optical fiber. With reference to FIG. 4, a light ray (a) travelling in parallel with the axis of the optical fiber, and a light ray (b) entering a boundary between the core 101 and clad 102 at an incident angle larger than 55.9°, transmit through the optical fiber. By way of contrast, a light ray (c) entering said boundary at an angle smaller than 55.9° is successively conducted to the adjacent optical fibers. Consequently, said light ray (c) makes a total reflection at a boundary between the fiber plate 17 and the free space, and is brought back to the phosphor layer 10. Therefore, said light ray (c) will appear to have emitted from phosphor particles different from those from which said light ray (c) originally emitted, thereby making the image contrast low.

Reference may now be made to other phosphor screens in which a phosphor layer is formed on a fiber plate (as set forth in Japanese Utility Model Publication No. 40-19,855 and U.S. Pat. No. 4,264,408). In these phosphor screens, concave indentations are formed on the surface of a fiber plate and phosphor particles are embedded in said concave indentations. However, a phosphor screen having such a fiber plate has a drawback, in that the image contrast is low, since the fiber plate and phosphor particles come into contact with each other over a broad area. Further, the technique of uniformly embedding the phosphor particles in the concave indentations is accompanied with problems, and lowers the brightness of an image.

SUMMARY OF THE INVENTION

Accordingly, a primary object of the present invention is to provide a phosphor screen capable of presenting a high quality image with high contrast and brightness.

Another object of this invention is to provide a method of manufacturing said phosphor screen.

To attain the above-mentioned objects, this invention provides a phosphor screen which is constructed by forming a phosphor layer on one side of an optical fiber plate comprised of a large number of bundled single optical, each of which fibers consists of a cylindrical core and a clad covering the peripheral wall of said core. With the phosphor screen constructed as described above, at least that portion of said core which faces the phosphor layer is removed, to provide a depression. Therefore, sufficiently large spaces are formed between the cores and phosphor layer, to prevent then from being in optical contact with each other.

The method of manufacturing a phosphor layer according to this invention comprises the steps of taking off one side portion of the respective cores to form depressions and forming a phosphor layer on that side of the optical fiber plate on which depressions are formed, in such manner that sufficiently large spaces are allowed between the phosphor layer and cores, to prevent them from being in optical contact with each other.

DETAILED DESCRIPTION OF THE PREFERRED EMBODIMENTS

Figure 1:
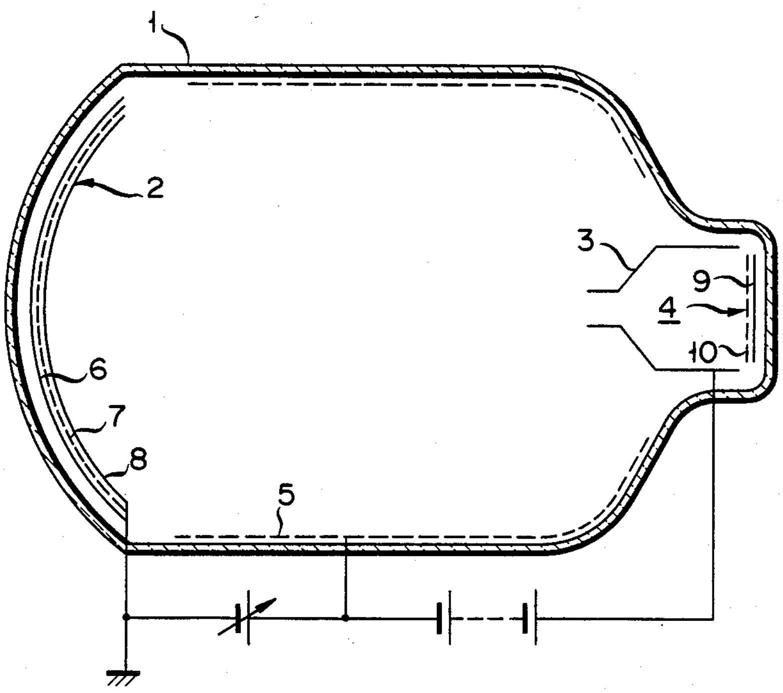
FIG. 1 shows the construction of the ordinary X-ray image intensifier.
Figure 2:
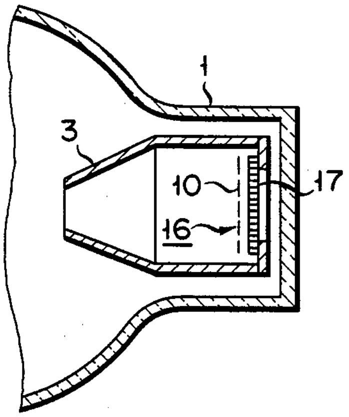
FIG. 2 is a cross-sectional view of the output portion of the conventional X-ray image intensifier.

A description may now be made of the case wherein the phosphor screen embodying this invention serves as the output screen of an image tube.

Concerning the output screen of an image tube, (FIG. 6), the surface portion of that side of the core 101 of each optical fiber constituting the optical fiber plate 17, which side faces the phosphor layer 10, is partly taken off by applying an etching acid, to thereby provide depressions 18. A glassy material having a high refractive index contains many metal components, in addition to the main constituent silicon, and is more easily corroded by acid than glassy materials having lower refractive indexes. When, one side portion of the fiber plate 17 is dipped into a solution of, e.g., hydrochloric acid or nitric acid, the core 101, which was prepared from a glassy material having a high refractive index, is more quickly corroded by such acid solution than the clad 102, which was formed of a glassy material having a low refractive index, thus producing depressions 18. Each depression is generally a depth of at least 1 μm, preferably, of from 1 to 30 microns. If the depression 18 has an excessively shallow depth, an optical contact results between the phosphor particles and the core 101 during the subsequent formation of the phosphor layer. In such a case, improvement of the image contrast of the output screen is undesirably impeded. Phosphor particles 201 are deposited on the fiber plate 17 provided with the above-mentioned depression 18, to form the output phosphor layer 10. In this case, the surface of the fiber plate is defined by the end surfaces of the respective clads 102. The phosphor particles should be so deposited as not to be allowed to fill depressions 18. The deposition of the phosphor particles 201 can be effected by a process commonly accepted in forming the phosphor screen of a picture tube, i.e., by the process of dipping a fiber plate into a suspension containing phosphor particles, to deposit phosphor particles on the fiber plate by precipitation; or by the process of forcefully depositing phosphor particles on the fiber plate, in a centrifugal machine. The above-mentioned processes permit the larger phosphor particles 201 to be the first which settle on the fiber plate, thereby causing the larger phosphor particles 201 to close the openings of the depressions 18 and, consequently, prevent the smaller phosphor particles 201 from plugging the depressions 18. Therefore, a sufficient amount of free space is provided in the depressions 18.

Preselection of the size of the phosphor particles 201 has great significance. If excessively larger phosphor particles 201 are deposited, the granularity of the phosphor layer 10 becomes prominent, resulting in an undesirable decline in the resolution of an image. Consequently, the average size of the phosphor particles 201 selected is less than 10 microns; or, preferably, less than 6 microns.

Figure 6:
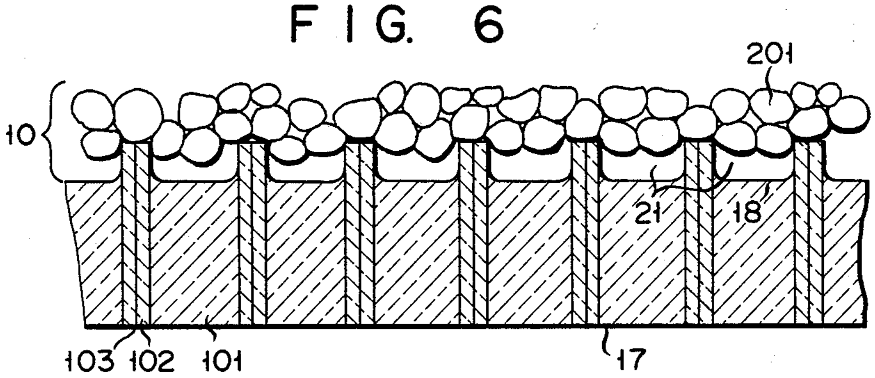
FIG. 6 is a fractional cross-sectional view of a phosphor screen according to another embodiment of the invention.

The method of manufacturing a phosphor screen according to this invention is characterized in that free spaces are allowed between the phosphor layer 10 and the cores 101 of the respective fibers, to prevent the phosphor particles 201 from coming into optical contact with the cores 101 of the fibers. Freedom from the above-mentioned optical contact is herein defined to mean that the phosphor particles 201 are separated from the cores 101 of the respective fibers at a distance greater than the length of the light waves issued from the phosphor particles 201. Consequently, the free spaces between the phosphor layer 10 and the cores 101 of the respective fibers should have a height greater than the length of a light wave sent forth from the phosphor layer 10. Based on this requirement, the free space need not occupy the whole of the depression 18. If the free space actually has the above-mentioned prescribed height, the phosphor particles 201 may partially enter the depression 18, as illustrated in FIG. 6. In other words, the space 21 (FIG. 6) may have a smaller height than that of the entire depression 18.

Figure 7:
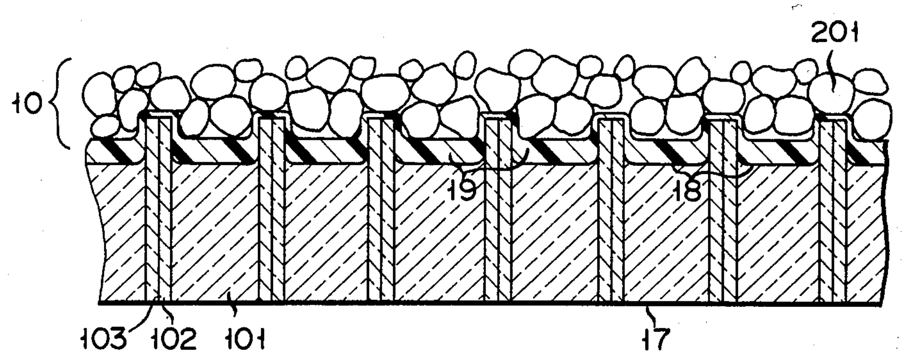
FIG. 7 is a cross-sectional view illustrating a phosphor screen-manufacturing method according to one embodiment of the present invention.

A description may now be made of the phosphor screen manufacturing method which assures the formation of the above-mentioned space 21. First, a fiber plate 17 is formed of a large number of fibers, each of which fibers is provided with a depression 18. A film 19 made of an organic material is then coated on said fiber plate 17, with a thickness corresponding to the height of the above-mentioned space (which has yet to be formed) as shown in FIG. 7. A phosphor layer 10 is deposited by an ordinary process on said organic material film 19. In this case, said organic material film 19 need not be spread over the entire surface of the fiber plate 17, since the purpose will be well served, even if said organic material is only used to fill the depression 18. Thereafter, the whole of the fiber plate 17 is heated, to evaporate the organic material film 19. The vapor of the volatilized organic material is released through the interstices between the phosphor particles 201, thereby providing the aforementioned space 21 (FIG. 6). In this case, heating is applied at a level higher than the boiling or decomposition point of the organic material. However, it is generally desirable to apply the heat at a temperature higher than 200° C.; and, preferably, at a level ranging from 200° C. to 400° C. Nitrocellulose is an optimum organic material.

The phosphor particles 201 are generally securely fixed by a bonding agent, such as liquid glass. If, therefore, fine phosphor particles happen to settle in, on the opening of the depression 18, they are prevented from falling into the space 21 after its formation.

Figure 8:
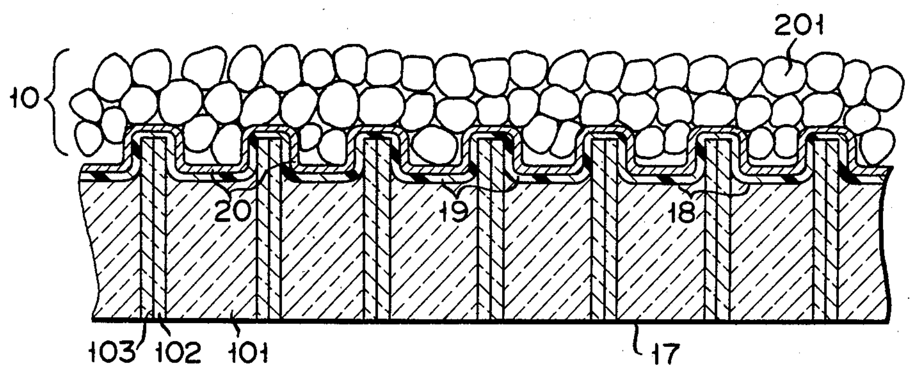
FIG. 8 is a cross-sectional view illustrating a phosphor screen-manufacturing method according to another embodiment of the invention.

A description may now be made, with reference to FIG. 8, of another method of providing the desired space. First, the organic material film 19 is spread over the entire surface of the fiber plate 17, or is only used to fill the depression 18. Thereafter, a transparent inorganic material film 20 is deposited on said organic material film 19. A phosphor layer 10 is mounted on said inorganic material film 20 by a conventional process. The whole of the fiber plate 17 is heated, to volatilize the organic material film 19. The vapor of the volatilized organic material is released through the pores of the inorganic material film 20 and the interstices between the phosphor particles 201. The above-mentioned process causes the organic material film 19 to be removed, while allowing the inorganic material layer 20 to be retained. Thus, even if the phosphor particles 201 are attached to each other with a relatively weak force, the desired space 21 can assuredly be formed in the depression 18. The transparent inorganic material film 20 should preferably by prepared from a metal oxide such as $Al_2O_3$, $In_2O_3$ or $SnO_2$, or from $SiO_2$ glass. With the above-mentioned process, the organic material film 19 was removed after the deposition of the phosphor layer 10. However, the same effect can be achieved, even if the organic material film 19 is taken off before the mounting of said phosphor layer 10.

With the above-mentioned fiber plate, the diameter of a single fiber is of great significance, from the standpoint of assuring good resolution of an image. Let us assume that Dmm represents the diameter of a single fiber; lp/mm denotes the space frequency of a light beam; and F(f) indicates the degree of modulation of the sinusoidal wave input, which shows the image transmission capacity of an optical fiber. Then, F(f) may be expressed as follows:

$$F(f) = \left[ \frac{2J_1(\pi fD)}{\pi fD} \right]^2 \times 100\ (\%)$$

($J_1$=primary Bessel function)

In an image tube, it is generally preferred that, with a high quality image, when a light beam has a space frequency f of 30 lp/mm, the degree of modulation of the sinusoidal wave be set at a level higher than 50%. When the term F(f) of the fiber plate 17 is calculated on the basis of this requirement, the diameter D of the single fiber should be 10 microns or less. If an output image from the image tube has a large diameter, the image will decrease in brightness, making it necessary to provide a large-diameter lens. Therefore, the fiber plate 17 entailed by the phosphor screen embodying this invention should preparably have an effective diameter of less than 50 mm.

As described above, this invention provides a phosphor screen with a fiber plate to improve its performance. The phosphor screen produces an image having a high quality and having a contrast higher than was formerly possible.

The reason the phosphor screen of the present invention can exhibit excellent image contrast is as follows. With the subject phosphor screen, the spaces defined between the phosphor particles 201 and the cores 101 of the respective optical fibers prevent both members from being brought into optical contact with each other. Therefore, a light beam emitting from the phosphor particles 201 passes through said space and into the fiber cores 101.

Figure 3:
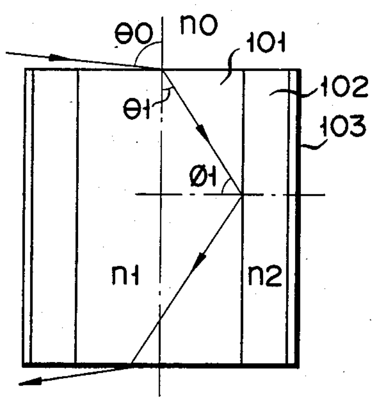
FIG. 3 illustrates the manner in which a light beam is transmitted through an optical fiber.
Figure 5:
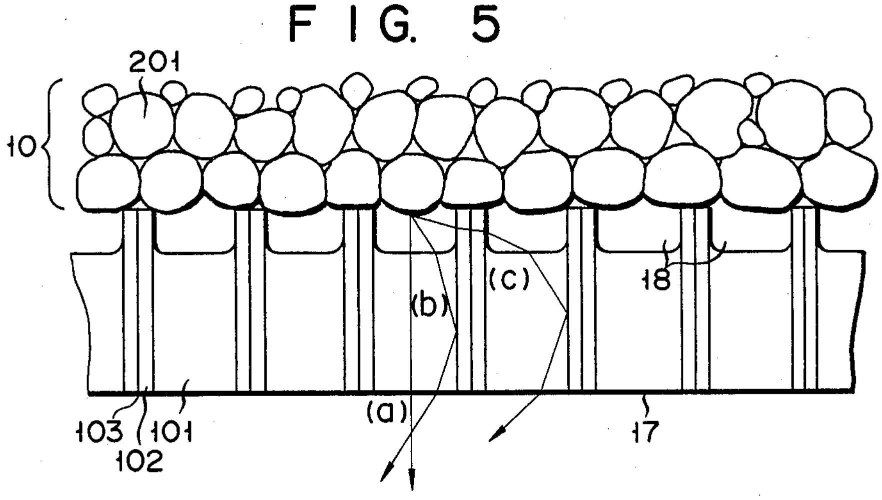
FIG. 5 is a fractional cross-sectional view of a phosphor screen according to one embodiment of this invention.

Reference may now be is made to the three light paths (a), (b), (c) shown in FIG. 5. A light beam conducted along light path (a) is axially carried through the fiber core 101. A light beam carried along light path (b) runs through the space and into the fiber core 101 at a given angle, and travels through the fiber core 101 with full reflection, as described with reference to FIG. 3. A light beam running along light path (c) is guided through the space, fiber clad 102 and absorbing layer 103, and travels through the core of the adjacent fiber, with full reflection.

Figure 4:
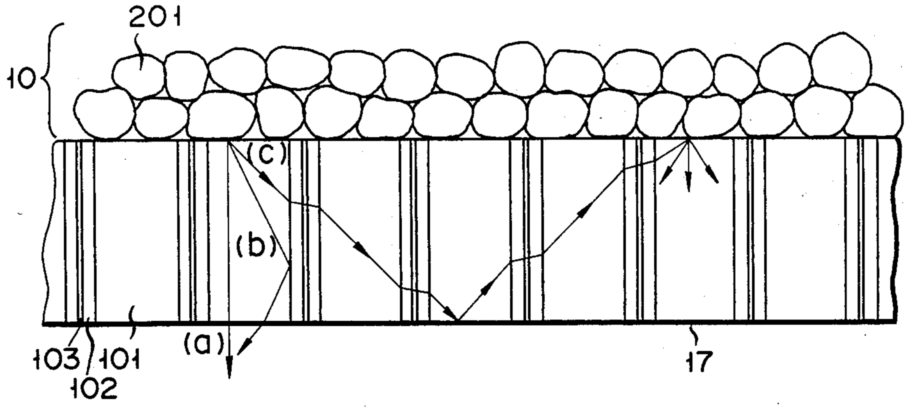
FIG. 4 is a fractional cross-sectional view of the conventional phosphor screen.

With the phosphor screen embodying this invention, therefore, no light beam appears which is carried along light path (c) (as shown in FIG. 4), thereby noticeably elevating the image contrast. Let us assume that a fiber plate 17 having a thickness of, e.g., 0.5 mm, is applied; that portion of the phosphor layer from which a light beam is emitted has a diameter of 20 mm; and that an electron beam shielding plate occupying 10% of the area of the above-mentioned light-emitting portion of the phosphor layer is provided at the center of said light-emitting portion at one time, and is not provided there at another time. When an image contrast is defined in terms of a comparison between the brightnesses realized in the presence and absence of said electron beam shielding plate, the phosphor screen of this invention assures a noticeably improved image contrast of about 100:1, versus the approximate ratio of 50:1 which is indicated by the image contrast of the conventional phosphor screen.

Figure 9:
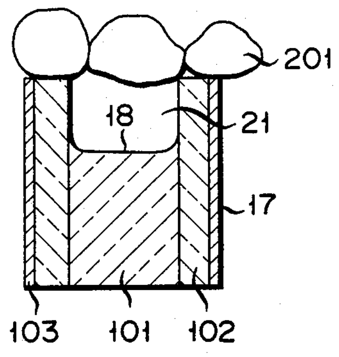
FIGS. 9 to 11 are cross-sectional views of a single optical fiber, showing the various outlines of the depressions formed by etching one side portion of the optical fiber plate.
Figure 10:
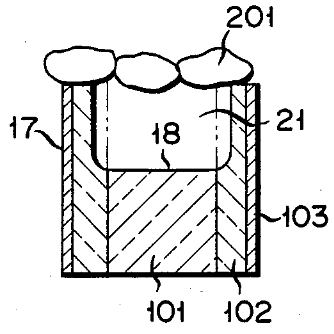
Figure 11:
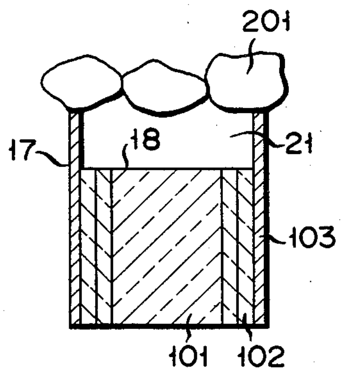

In the case wherein the fiber plate is etched by an acid solution, a depression etching need not be effected on the fiber core 101 alone, as shown in FIG. 9. However, as shown in FIG. 10, it is possible to carry out etching to reduce the thickness of the fiber clad 102. Further, as illustrated in FIG. 11, it is possible perform etching to such an extent that the entire thickness of the upper portion of the fiber clad 102 is taken off. In the construction of FIG. 11, the desired space is defined by the end surfaces of the fiber core 101 and fiber clad 102, the inner wall of the end portion of the light-absorbing layer 103 and the phosphor particles 201. The important point here, is that a sufficient space be allowed between the phosphor particles 201 and fiber core 101, to prevent an optical contact from occurring.

The foregoing description refers to the case wherein the present invention is applied to the output phosphor screen of an image tube. However, this invention need not be limited to such an application, since it is also widely applicable to a phosphor screen constructed by depositing a phosphor layer on the surface of an optical fiber plate.

What is claimed is:

1. A phosphor screen comprising:

an optical fiber plate having a first surface, said plate being formed of a plurality of bundled signal optical fibers, wherein a light-absorbing layer is formed between said single optical fibers, each of said fibers including a cylindrical core and a clad surrounding said core such that said clad extends to said first surface and said core extends to a point short of said first surface thus forming a depression, said depression being formed by removing a portion of said core which is adjacent to said first surface, and by etching a portion of said clad which is adjacent to said first surface, and a phosphor layer formed on said first surface of said optical fiber plate, wherein a sufficiently large space is formed between said core and said phosphor layer to prevent said core and said phospher layer from being brought into optical contact with each other.

2. A phosphor screen comprising:

an optical fiber plate having a first surface, said plate being formed of a plurality of bundled single optical fibers, each of said fibers including a cylindrical core and a clad surrounding said core such that said clad extends to said first surface and said core extends to a point short of said first surface thus forming a depression, a phosphor layer formed on said first surface of said optical fiber plate, and a transparent inorganic material formed in said space between said core of each of said optical fibers and said phosphor layer, wherein a sufficiently large spaced is formed between said core and said phosphor layer to prevent said core and said phospher layer from being brought into optical contact with each other.

3. The phosphor screen according to claim 2, wherein said transparent inorganic material layer is prepared from a metal oxide or glass.

4. A method of manufacturing a phosphor screen comprising an optical fiber plate having a first surface, said plate being formed of a plurality of bundled single optical fibers, each of said fibers including a cylindrical core and a clad surrounding said core such that said clad extends to said first surface and said core extends to a point short of said first surface thus forming a depression, and a phosphor layer formed on said first surface of said optical fiber plate, said method comprising the steps of:

creating said depression in each of said optical fibers by removing a portion of said core which is adjacent to said first surface, and forming said phosphor layer on said first surface of said optical fiber plate by dipping said optical fiber plate into a suspension containing phosphor particles to deposit said phosphor particles by precipitation on said first surface, wherein a sufficiently large space is formed between said phosphor layer and said core to prevent said phosphor layer and said core from being brought into optical contact with each other.

5. The method according to claim 4, further comprising, after the step of creating said depression, the step of coating said first surface with an inorganic material; and further comprising after the step of forming said phosphor layer, the step of heating said optical fiber plate to a temperature higher than the boiling point or decomposition point of said organic material to volatize said organic material thereby providing space between said core and said phosphor layer.

6. The method according to claim 5, wherein said organic material is prepared from nitrocellulose.

7. The method according to claim 5, further comprising after the step of coating, the step of depositing a transparent inorganic material on said first surface, and wherein the heating step is before or after the forming said phosphor layer step.

8. The method according to claim 7, wherein said transparent inorganic material is prepared from metal oxide or glass.

9. A phosphor screen comprising:

an optical fiber plate having a first surface, said plate being formed of a plurality of bundled single optical fibers, each of said fibers including a cylindrical core and a clad surrounding said core such that said clad extends to said first surface and said core extends to a point short of said first surface thus forming a depression, said depression being formed by removing a portion of said core which is adjacent to said first surface, and by removing an interior portion of said clad which is adjacent to said first surface, and a phosphor layer formed on said first surface of said optical fiber plate, wherein a sufficiently large space is formed between said core and said phosphor layer to prevent said core and said phospher layer from being brought into optical contact with each other.

10. A method of manufacturing a phosphor screen comprising an optical fiber plate having a first surface, said plate being formed of a plurality of bundled single optical fibers, each of said fibers including a cylindrical core and a clad surrounding said core such that said clad extends to said first surface and said core extends to a point short of said first surface thus forming a depression and a phosphor layer formed on said first surface of said optical fiber plate, said method comprising the steps of:

creating said depression in each of said optical fibers by removing a portion of said core which is adjacent to said first surface, and forming said phosphor layer on said first surface of said optical fiber plate by forcefully depositing said phosphor particles by a centrifugal machine on said first surface, wherein a sufficiently large space is formed between said phosphor layer and said core to prevent said phosphor layer and said core from being brought into optical contact with each other.

* * * * *